Sept. 10, 1957 — C. S. GLENNY — 2,805,806
BICYCLE BASKET
Filed Oct. 4, 1954
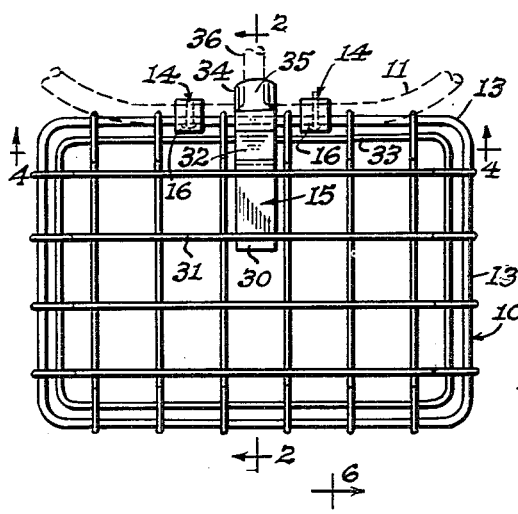
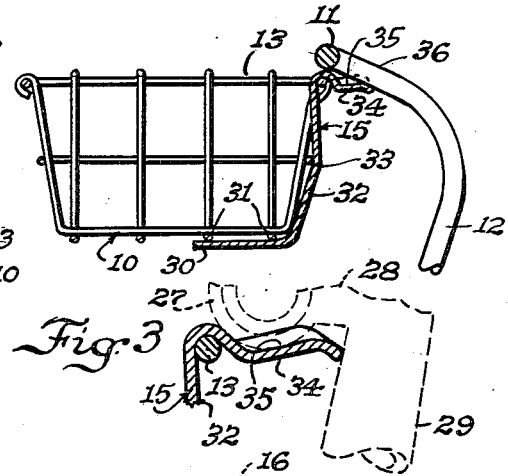
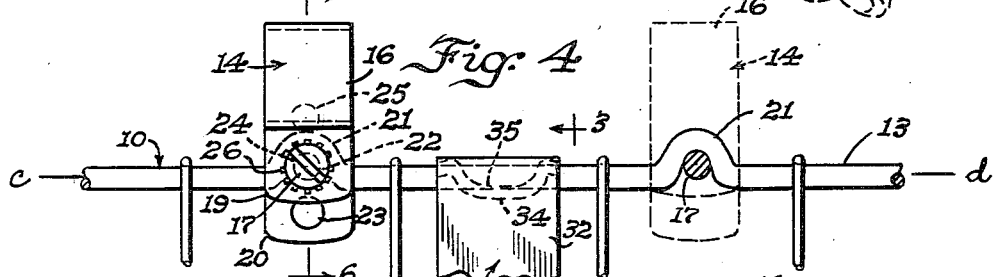
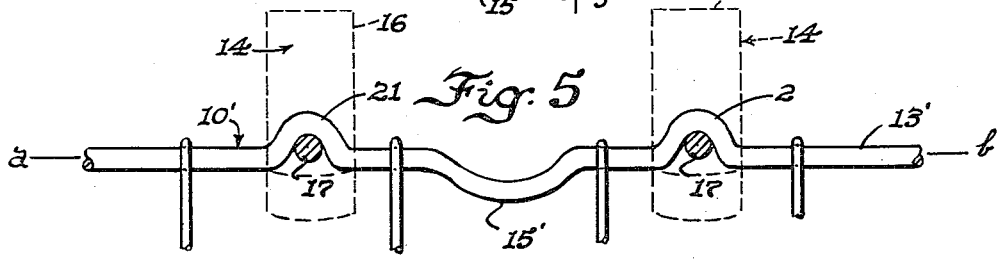
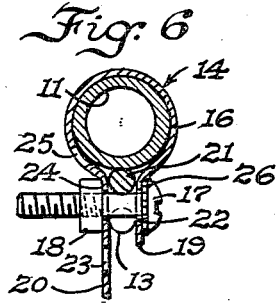
Inventor
Clarence S. Glenny

United States Patent Office 2,805,806
Patented Sept. 10, 1957

2,805,806

BICYCLE BASKET

Clarence S. Glenny, Rockford, Ill., assignor to The Washburn Company, Worcester, Mass., a corporation of Massachusetts Application October 4, 1954, Serial No. 460,053

8 Claims. (Cl. 224—41)

This invention relates to bicycle baskets and is more particularly concerned with one especially designed and adapted for use on velocipedes, tricycles, and sidewalk bicycles.

The principal object is to provide a low-cost smaller and lighter basket designed for easy rigid application to the kinds of handle-bars used on velocipedes and smaller bicycles, where the kind of bracing or propping commonly resorted to in the case of the larger and heavier baskets applied to the handle-bars on regular bicycles cannot be employed. In other words, my invention is concerned with providing improved attaching and supporting means for mounting the basket on the handlebar, whereby it can be held satisfactorily so that there is no need for any prop attached to the front mud guard, front fork or front axle, while also making the basket substantially universally adaptable to different makes and models of velocipedes and small bicycles.

A salient feature of the present construction is the provision of upwardly bent inverted V or U-shaped loops on the wire top frame of the basket, which are designed to accommodate clamping bolts in the crotches thereof arranged to draw together the end portions of sheet metal clips that encircle the handlebar and have said end portions abutting the flat opposite sides of said loops and are wide enough to straddle said loops, whereby to tighten the clips on the handlebar and at the same time fasten the basket in rigid relationship to the end portions of the clips by the abutment of these end portions against the opposite sides of said loops. Thus, there is no real need for any brace or prop, especially on such a small light load basket, and very little additional support of that kind is provided. The sheet metal clips are preferably provided with a plurality of longitudinally spaced holes in one end portion to receive the clamping bolt in whichever one of these holes should be used for a given diameter of handlebar. Thus, for example, the endmost hole is used when the clip surrounds a large handlebar, the second hole is used when the clip surrounds a medium sized bar, and the third hole is used when the clip is applied to the smallest handlebar. One size and style of clips will therefore fit all three sizes of handlebars.

Another important feature is the provision of a center brace which, in the preferred form, consists of a sheet metal bracket fastened onto the back of the basket and having a top portion projecting rearwardly under the middle portion of the handlebar for more rigid support of the basket, another form involving merely the provision of a downwardly bent loop portion at the middle of the wire top frame for extension under and abutment with the middle portion of the handlebar for more rigid support of the basket.

The invention is illustrated in the accompanying drawing, in which—

Fig. 1 is a plan view of a basket made in accordance with my invention and indicating in dotted lines the relationship of a velocipede handlebar to the basket when mounted on the velocipede;

Fig. 2 is a vertical section through the basket on the line 2—2 of Fig. 1 showing how the center brace has abutment with the underside of the rearwardly extending neck of said handle;

Fig. 3 is an enlarged sectional detail on the line 3—3 of Fig. 4 showing the parts approximately full size and indicating in dotted lines how the clamp portion on the upper end of a handle-bar stem is arranged to engage in the depression provided in the rearwardly projecting portion of the center brace for rigid support of the basket;

Fig. 4 is a view on line 4—4 of Fig. 1 showing the upper rear portion of the basket and illustrating a handlebar clip applied to one of the upwardly bent loop portions on the wire top frame but showing the other loop portion in front elevation and indicating in section the location of the clamping bolt, the position of the clip associated with that bolt being indicated in dotted lines;

Fig. 5 is a view similar to Fig. 4 showing a modified or alternative construction, and Fig. 6 is a sectional detail on the line 6—6 of Fig. 4.

Similar reference numerals are applied to corresponding parts throughout the views.

Referring to the drawing, the basket designated generally by the numeral 10 is shown supported on the handlebar 11 of a velocipede, only the supporting stem 12 for the handlebar being shown in Fig. 2. A handlebar is indicated at 11 in dotted lines in Fig. 1. In accordance with the present invention, the wire top frame 13 is of special construction to cooperate with improved handlebar attaching means 14 and center brace means 15, the special construction of the wire top frame 13 enabling the rigid support of the basket on the handle-bar using simple and economical sheet metal clips like those indicated at 16. These clips are designed to encircle the handlebar and be drawn up tightly thereon by the tightening of bolts 17 in nuts 18 so that the end portions 19 and 20 of the clips 16, which are wide enough to straddle the loops 21 in the frame 13, as clearly appears in Fig. 4, are brought more or less into engagement with the flat faces on the opposite sides of these upwardly bent inverted V or U-shaped loops 21 provided on the wire top frame 13. The bolts 17 extend through the crotches of the loops 21, as clearly indicated in Figs. 4 and 6. A single hole 22 is provided in the one end portion 19 of each clip 16, but there are three holes 23, 24 and 25 provided in longitudinally spaced relation in the other end portion 20, as clearly appears in Fig. 6, the bolt 17 being passed through the hole 22 in the one end portion 19 and through whichever one of the three holes 23—25 will enable drawing the clip into tight clamping engagement with the handlebar 11 and at the same time bring the end portions 19 and 20 close to if not in clamping engagement with opposite sides of the loop 21, the middle hole 24 being the one illustrated as used in Fig. 6. A lock washer 26 is preferably provided under the head of the bolt 17 to reduce likelihood of the bolt loosening after the bolt has once been tightened properly. It is manifest from inspection of Fig. 6 that when the clip 16 has been drawn up tightly enough to clamp the handlebar 11 the end portions 19 and 20 of the clip are then also either in full clamping engagement with opposite sides of the loop portion 21 or in more or less abutment therewith so as to fasten the basket in rigid relationship to the handlebar well enough, so that in most cases no additional support or brace for the basket is needed. The clips 16, it will be understood, are of sheet metal having enough springiness so that the portion that surrounds the handle bar may be disposed with its axis at an acute angle with respect to the substantially vertical planes of the end portions 19 and 20 that have abutment with the loop portions 21 of the wire top frame 13. In other words, the construction is widely if not universally adaptable to the requirements of different sizes and shapes of handlebars on velocipedes and sidewalk bicycles, and, inasmuch as the basket is supported substantially entirely by the handlebar and does not rely for support upon a prop attached to the front fork, front mud guard or front axle, it follows that the basket is substantially universally applicable to different makes and models of velocipedes and sidewalk bicycles.

For such slight additional support or bracing as the basket may need, I provide either a center brace 15 of sheet metal construction, as shown in Figs. 1 to 4, or provide a downwardly bent loop 15' at the middle of the back portion of the wire top frame 13', as shown in Fig. 5, this basket 10', it being understood, being otherwise of the same construction as the basket 10 and adapted to be fastened to the handlebar in the same way by sheet metal clips 16 and bolts 17. The loop 15', it will be understood, extends under and has abutment with the front portion of the clamp 27 provided on the front end of the forwardly reaching arm 28 on the upper end of a handlebar stem 29 like that shown in Fig. 3, whereby to assume a portion of the torque about the axes a—b (Fig. 5) defined by the back portion of the wire top frame 13', the rest and greater portion of the torque being assumed by the engagement of the upwardly projecting sheet metal loop portions 21 between the end portions 19 and 20 of the clips 16.

The sheet metal brace 15 is of generally L-shaped construction, as best appears in Fig. 2, providing a substantially horizontal portion 30 that is adapted to be welded or otherwise suitably secured to the longitudinally extending wires 31 of the bottom of the basket 10, and a substantially vertical portion 32 which extends up the back of the basket behind the wire middle frame 33 and in front of the back portion of the wire top frame 13, the portion 32 being welded or otherwise suitably secured to said frames 33 and 13. The upper end portion of the vertical portion 32 is bent rearwardly to provide a supporting projection 34 which has a depression 35 provided therein to accommodate the bottom portion of the handlebar clamp 27, as shown in Fig. 3, or simply engage the under side of the rearwardly extending neck portion 36 of the handlebar 11, as shown in Figs. 1 and 2. Here again, the engagement of this rearwardly projecting portion 34 on the underside of the handlebar clamp 27 or neck 36 assumes a portion of the torque to prevent turning of the basket around axis c—d defined by the rear portion of the wire top frame 13 of the basket, the other and greater portion of the torque being assumed by the engagement of the upwardly bent loop portions 21 of the frame 13 between the end portions 19 and 20 of the clips 16.

It is believed the foregoing description conveys a good understanding of the objects and advantages of my invention. The appended claims have been drawn to cover all legitimate modifications and adaptations.

I claim:

1. A bicycle basket comprising a body having a wire top frame, generally U-shaped sheet metal clips adapted to encircle a handlebar on which the basket is to be supported, each having closely spaced substantially parallel perforated end portions for connection with the basket, bolts passed through the perforated end portions of said clips and the basket to draw said end portions together clamping the handlebar in the clips while fastening the clips to the basket, and an abutment on said top frame arranged for engagement by a part rigid with the handlebar to brace said basket for more rigid support thereof, said abutment comprising a generally U-shaped projection bent downwardly from the back portion of said frame at the middle thereof.

2. A bicycle basket comprising a body having a wire top frame, generally U-shaped sheet metal clips adapted to encircle a handlebar on which the basket is to be supported, each having closely spaced substantially parallel perforated end portions for connection with the basket, bolts passed through the perforated end portions of said clips and the basket to draw said end portions together clamping the handlebar in the clips while fastening the clips to the basket, and a projection on said top frame arranged for engagement by a part rigid with the handlebar to brace said basket for more rigid support thereof, said projection being defined on a metal strap attached to the back wall of the basket, said strap having a top portion extending rearwardly from the back portion of the top frame for engagement with a bottom surface on the part rigid with the handlebar.

3. A bicycle basket comprising a body having a wire top frame, generally U-shaped sheet metal clips adapted to encircle a handlebar on which the basket is to be supported, each having closely spaced substantially parallel perforated end portions for connection with the basket, bolts passed through the perforated end portions of said clips and the basket to draw said end portions together clamping the handlebar in the clips while fastening the clips to the basket, and a projection on said top frame arranged for engagement by a part rigid with the handlebar to brace said basket for more rigid support thereof, said projection being defined on a metal strap attached to the back wall of the basket, said strap having a top portion extending rearwardly from the back portion of the top frame for engagement with a bottom surface on the part rigid with the handlebar, said rearwardly projecting top portion of said metal strap being bent to define a trough to accommodate the handlebar part and center the basket relative to the handlebar and resist lateral displacement from the assembled position.

4. A bicycle basket comprising, in combination, a body having openings provided in the back top portion thereof in longitudinally spaced relation adapted to receive fastening bolts, generally U-shaped sheet metal clips adapted to encircle a handlebar on which the basket is to be supported, each having closely spaced substantially parallel perforated end portions adapted to receive therebetween the perforated back top portions respectively of said basket in substantially parallel relationship thereto, bolts passed through the perforated end portions of said clips and through the openings in the back top portion of said basket and adapted to draw said end portions together into close if not clamping engagement with the back top portion of said basket for rigid support of the basket on the handlebar while at the same time clamping the handlebar in the clips to prevent turning of the basket about the handlebar as an axis, and a projection on said back top portion of said basket arranged for engagement by a part rigid with the handlebar to brace said basket for more rigid support thereof, said projection being defined on a metal strap attached to the back wall of the basket, said strap having a top portion extending rearwardly from the back portion of the basket for engagement with a bottom surface on the part rigid with the handlebar.

5. A bicycle basket comprising, in combination, a body having openings provided in the back top portion thereof in longitudinally spaced relation adapted to receive fastening bolts, generally U-shaped sheet metal clips adapted to encircle a handlebar on which the basket is to be supported, each having closely spaced substantially parallel perforated end portions adapted to receive therebetween the perforated back top portions respectively of said basket in substantially parallel relationship thereto, bolts passed through the perforated end portions of said clips and through the openings in the back top portion of said basket and adapted to draw said end portions together into close if not clamping engagement with the back top portion of said basket for rigid support of the basket on the handlebar while at the same time clamping the handlebar in the clips to prevent turning of the basket about the handlebar as an axis, and a projection on said back top portion of said basket arranged for engagement by a part rigid with the handlebar to brace said basket for more rigid support thereof, said projection being defined on a metal strap attached to the back wall of the basket, said strap having a top portion extending rearwardly from the back portion of the basket for engagement with a bottom surface on the part rigid with the handlebar, said rearwardly projecting top portion of said metal strap being bent to define a trough to accommodate the handlebar part and center the basket relative to the handlebar and resist lateral displacement from the assembled position.

6. A bicycle basket comprising, in combination, a body having a wire top frame including a back portion, means defining moment arms on the back portion of said frame to assume torque enabling supporting the basket solely by the back portion thereof, said means comprising, as integral portions of the back portion of said frame, outwardly bent generally U-shaped projections of small radius both arms of which are joined to the frame by arcuate connecting portions of smaller radius, said projections defining eyes therein adapted to receive fastening bolts, generally U-shaped sheet metal clips that are substantially coaxially aligned and adapted to encircle a handlebar on which the basket is to be supported, each having closely spaced substantially parallel perforated end portions that are both wider and longer in relation to the width and length of said U-shaped projections and therefore adapted to cover both sides thereof completely, as well as their connecting portions, and straddle the frame and receive the respective projections therebetween in substantially parallel relationship thereto, and bolts passed through the perforated end portions of said clips and the eyes in said projections and adapted to draw said end portions together into close if not clamping engagement with opposite sides of said projections for rigid support of the basket on the handlebar while at the same time clamping the handlebar in the clips to prevent turning of the clips and basket about the handlebar as an axis.

7. A bicycle basket as set forth in claim 6, including a projection on said top frame arranged for engagement under a part that is rigid with the handlebar, whereby to provide additional support for said basket by resisting turning of the top frame with respect to said clips.

8. A bicycle basket comprising, in combination, a body of generally rectangular form having on the back top portion thereof two laterally spaced rigid projections in which openings are provided adapted to receive fastening bolts, generally U-shaped sheet metal clips adapted to encircle a handlebar on which the basket is to be supported, each having closely spaced substantially parallel perforated end portions that are wide in relation to said projections and receive the respective projections therebetween in substantially parallel relationship thereto, bolts passed through the perforated end portions of said clips through openings in said projections and adapted to draw said end portions together into close if not clamping engagement with opposite sides of said projections for rigid support of the basket on the handlebar while at the same time clamping the handlebar in the clips to prevent turning of the basket about the handlebar as an axis, and a projection on the back top portion of the body of said basket arranged for engagement under a part that is rigid with the handlebar, whereby to provide additional support for said basket by resisting turning of the basket with respect to said clips.

References Cited in the file of this patent

UNITED STATES PATENTS

| 2,183,822 | Pawsat | Dec. 19, 1939 |

FOREIGN PATENTS

| 133,091 | Sweden | Sept. 25, 1951 |
| 456,701 | Canada | May 17, 1949 |
| 629,844 | Great Britain | Sept. 29, 1949 |